June 4, 1935.  J. W. GREIG  2,003,933
THREE DIMENSION RADIO DIRECTION FINDER
Filed Dec. 27, 1932  4 Sheets-Sheet 1
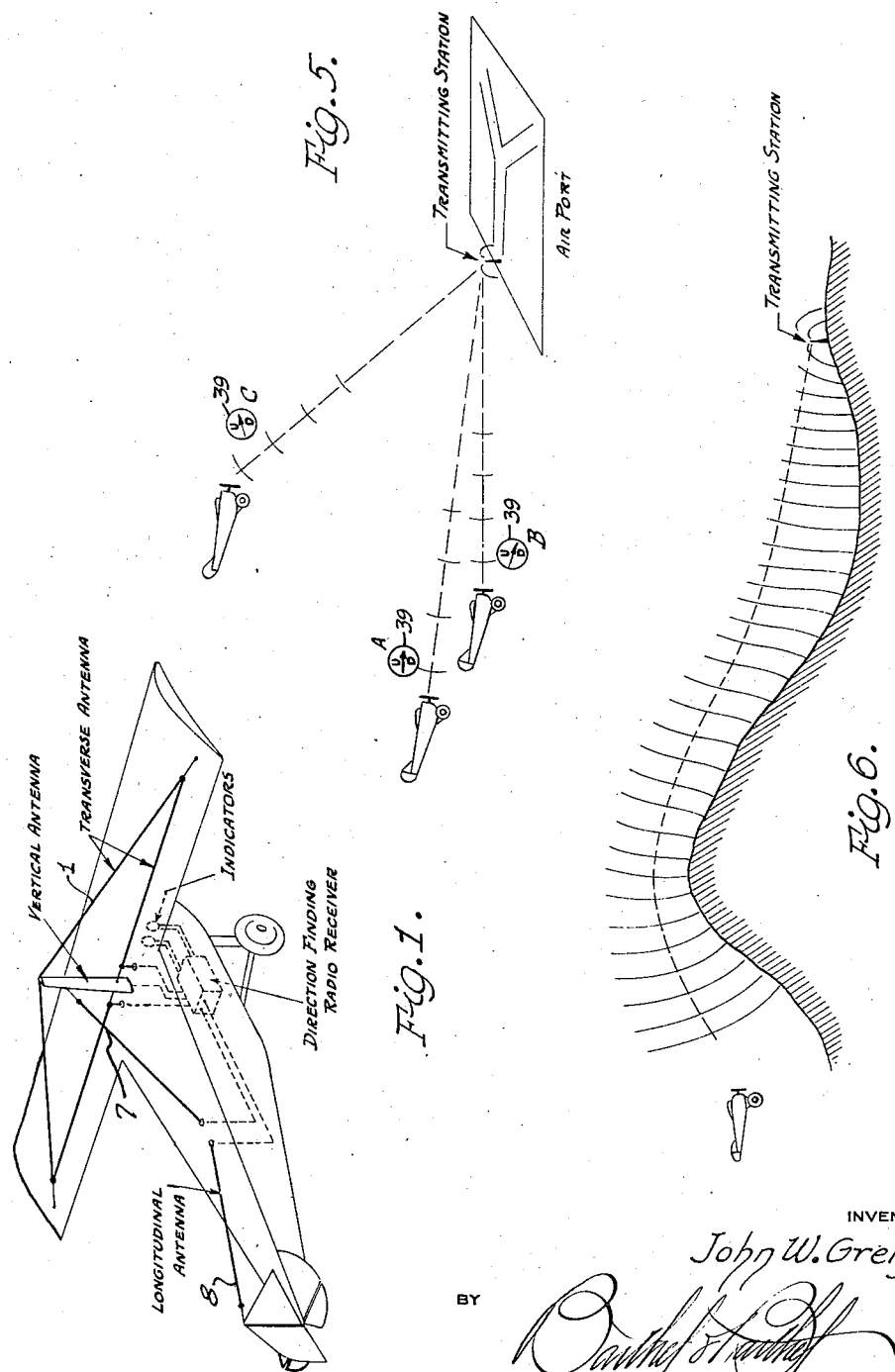

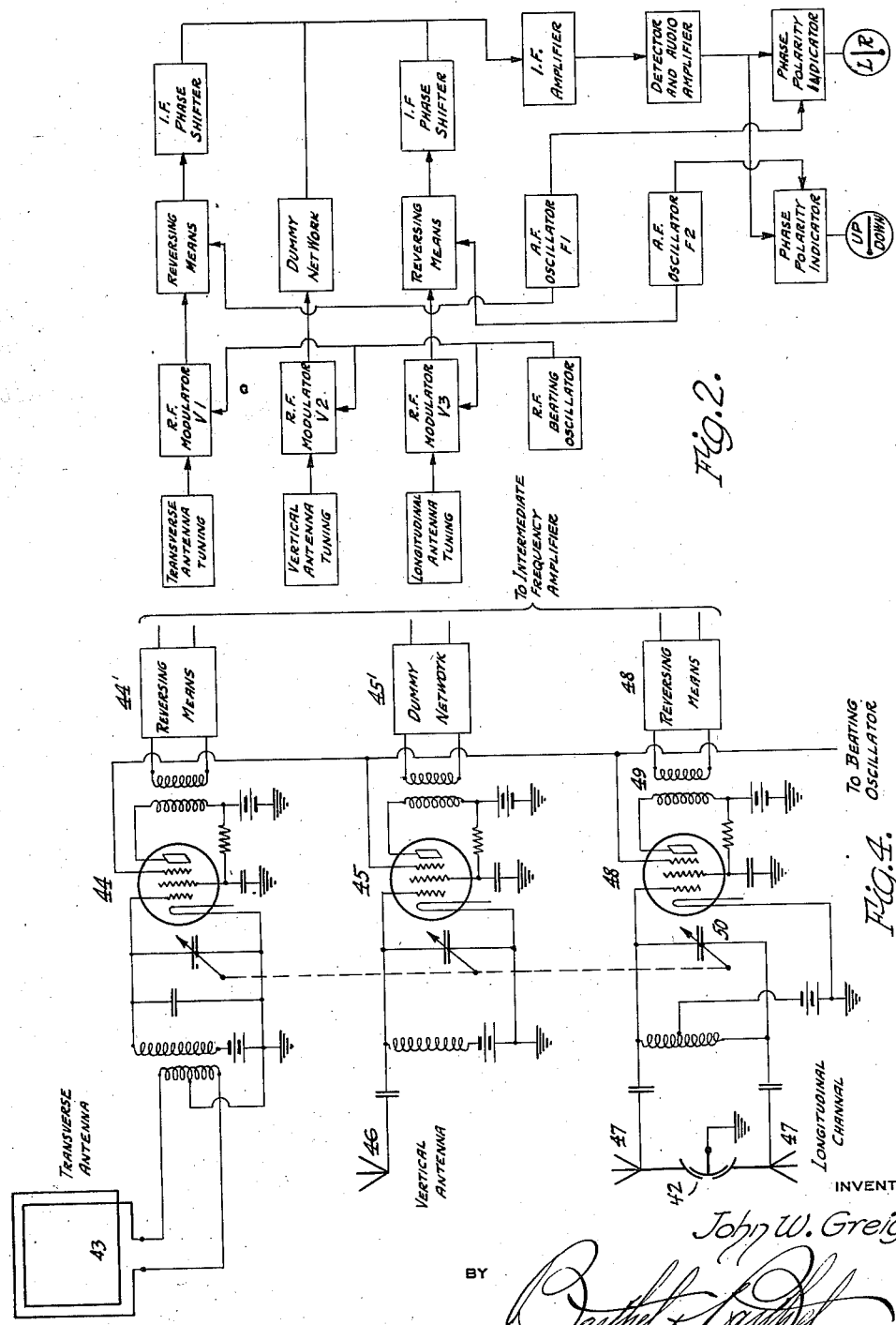

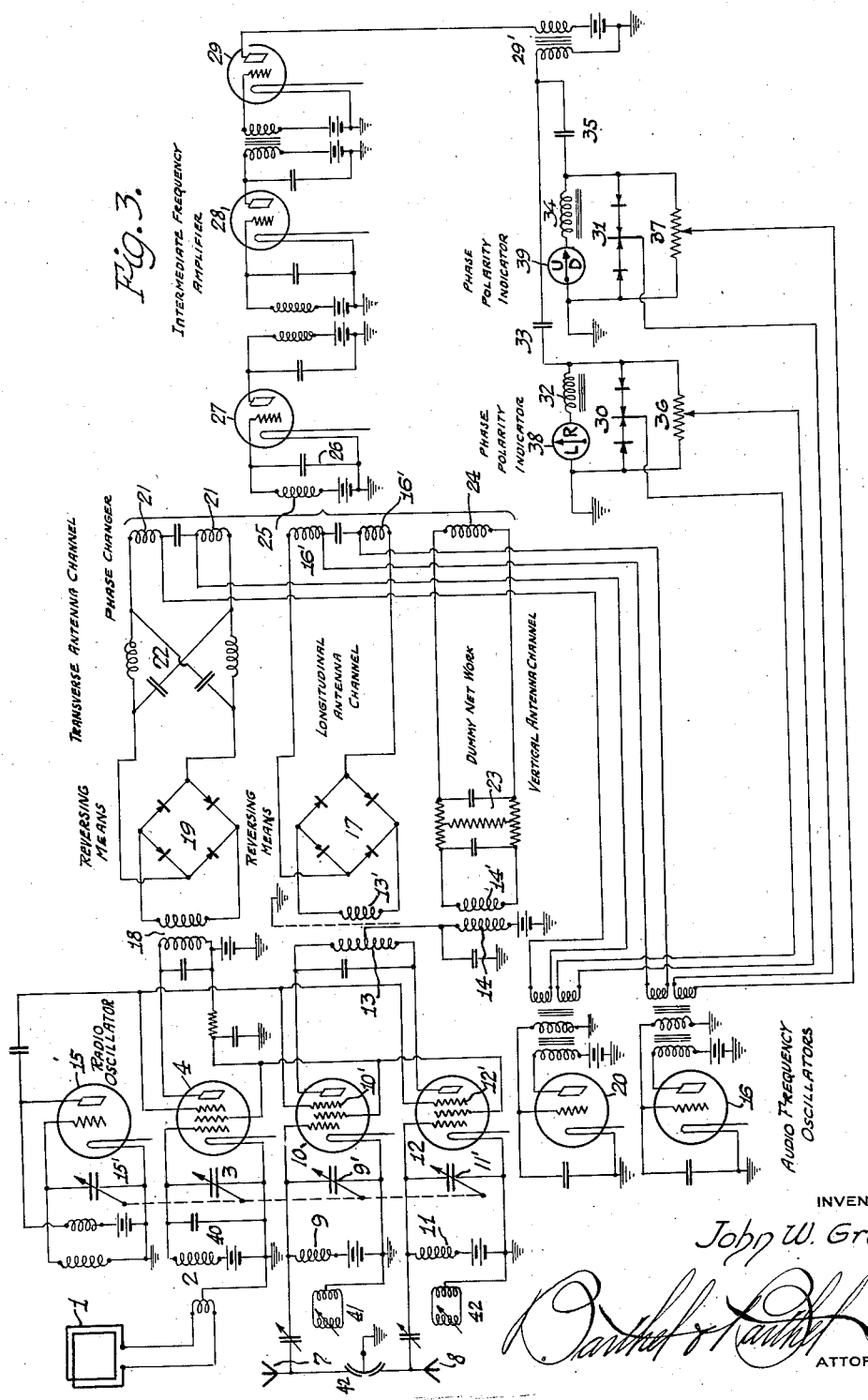

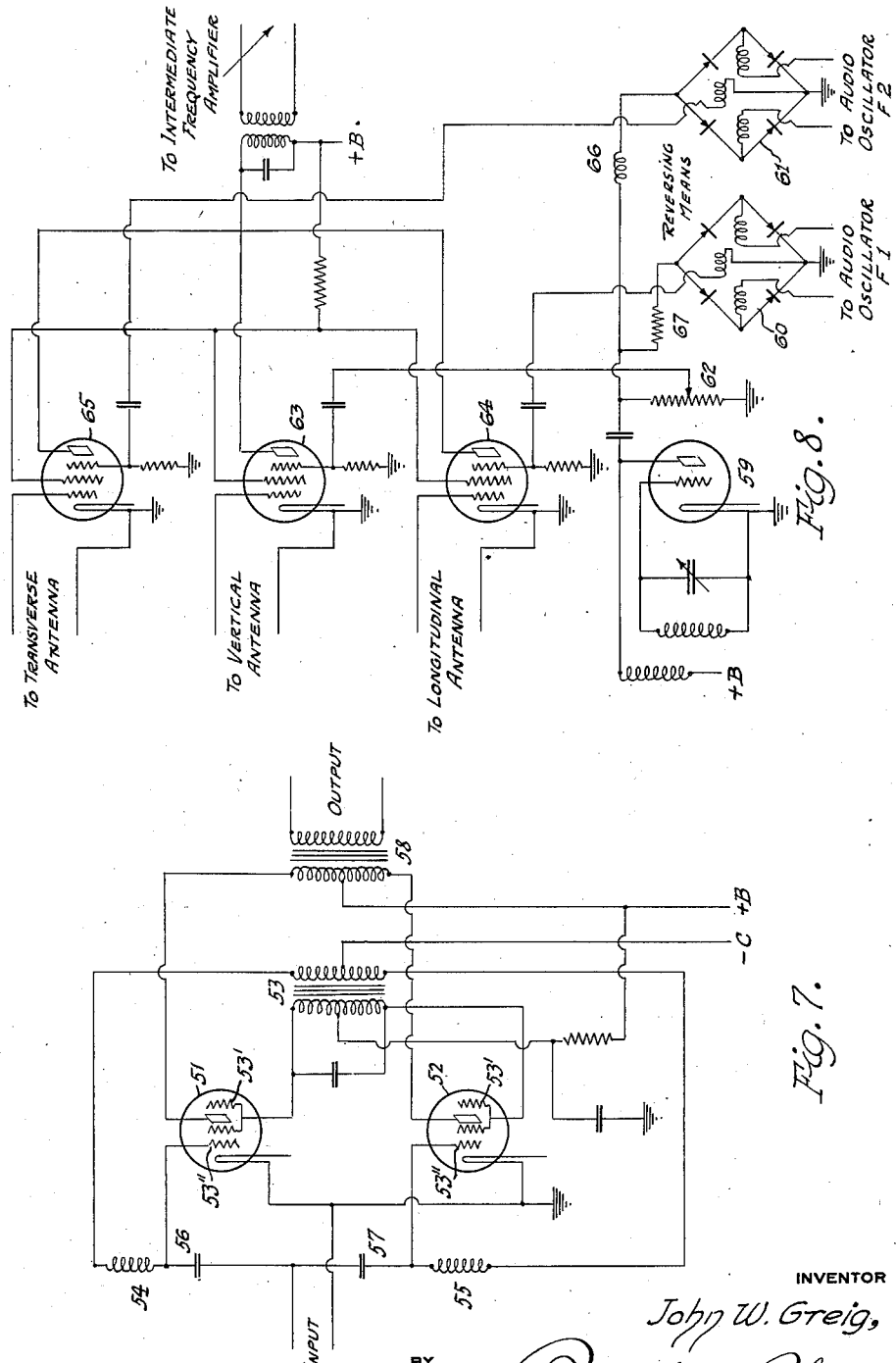

Patented June 4, 1935

2,003,933

UNITED STATES PATENT OFFICE 2,003,933

THREE DIMENSION RADIO DIRECTION FINDER

John W. Greig, Detroit, Mich.

Application December 27, 1932, Serial No. 648,913

8 Claims. (Cl. 250—11)

My invention pertains to improvements in radio direction finding apparatus for determining the direction of arrival of radio waves in three dimensional space, and is especially adaptable for use as a guide to the pilot of aircraft whereby such aircraft may readily be directed in the direction of a landing field during periods of low visibility such as fogs, rains and storms.

It is well known in the art of radio direction finding that a vertical loop may be employed to determine the vertical plane of arrival of radio waves, since when the plane of the loop is at right angles to the plane of arrival, the magnetic field of the radio waves cuts both sides of the loop at the same instant, and the E. M. F. induced in one side is in exact phase opposition to the E. M. F. induced in the other side so that the resultant output E. M. F. is zero. However, when the plane of the loop is not at right angles to the plane of arrival, the E. M. F. induced in the nearer conductor of the loop will be advanced in phase over the E. M. F. induced in the farther conductor of the loop, with the result that the difference between the two E. M. F.'s will not be zero, but will be an E. M. F. which is substantially in phase quadrature to the E. M. F. induced in the conductors of the loop. The magnitude of this output E. M. F. will be proportional to the sine of the angle of deviation of the plane of arrival from the plane perpendicular to the loop, and its phase polarity a function of whether the right or the left edge of the loop is nearer to the direction of arrival of the radio waves.

It is also well known in the art of radio direction finding that the direction of arrival of the radio waves may be determined by a measurement of the magnitude and phase polarity of the output of the loop, and means have been described by previous inventors for the use of this principle. For example, if a vertical antenna is placed close to the loop, an E. M. F. will be induced in this antenna which is not a function of the direction of arrival of the radio waves, and which may be used as a standard of comparison for the determination of the relative magnitude and phase polarity of the output E. M. F. of the loop. A simple form of measurement may be made by providing a reversing switch whereby the output of the loop may be added to the output of the vertical antenna with either normal or reverse poling, and comparing the magnitudes of the outputs from a radio receiver supplied by the loop and vertical antenna in combination for the conditions of normal and reverse poling of the switch. If the output of the receiver is the same for both normal and reverse polings, the direction of arrival of the radio waves is then at right angles to the loop, since the loop has then no output E. M. F. and has no effect when combined with the output from the vertical antenna. However, when the direction of arrival is to the right of the perpendicular position, the output of the loop will add to the output of the vertical antenna (assuming the connections to be so poled and suitable phase shifting means provided) when the reversing switch is in the normal position and will subtract when the reversing switch is in the reverse position. Conversely, when the direction of arrival is to the left of the perpendicular position, the output of the loop will subtract from the output of the vertical antenna when the reversing switch is in the normal position, and will add when the reversing switch is in the reverse position. Therefore the relative right or left direction of arrival may be determined by an observation of the position of the reversing switch which gives the greatest output from the receiver, and the approximate magnitude of the deviation from the perpendicular to the plane of the loop determined by the difference in the output of the receiver with the reversing switch in the normal position and the output with the reversing switch in the reverse position.

Various methods have been heretofore proposed for an automatic operation of the reversing switch and indicating the position of the switch which gives the maximum output from the receiver, in order to make the system suitable for use on aircraft or other mobile vehicles. In the most practical forms, the reversing switch or other equivalent device has been operated at a high speed of alternation so that the alternate addition and subtraction of the loop and antenna outputs have produced an audio frequency modulation of the carrier supplied to the receiver. The phase of the audio frequency derived from the output of the receiver is then compared with the phase of the audio current employed to actuate the reversing means, the relative plus or minus phase polarity indicated by a zero center meter, and this polarity employed as an indication of the deviation of the direction of arrival of the radio waves from the perpendicular to the loop.

Such a method has been described by the applicant in my copending application, Serial No. 648,912, filed December 27, 1932, in which the reversal and necessary phase shifting operations are performed at a fixed intermediate frequency.

It is the object of the invention described herein to extend such a method of direction finding to determine the direction of arrival of the radio waves in a vertical plane as well as in a horizontal plane, said vertical and horizontal planes being referred to the nominal vertical and horizontal axes of the vehicle upon which the receiving equipment is mounted.

In particular, it is the object of this invention to provide a means whereby the pilot of an airplane can determine the direction of a radio transmitter located at a landing field with reference to the vertical and transverse horizontal axes of the ship in a manner equivalent to actual visual observation of the transmitting beacon.

It is a further object of my invention to provide a means whereby the pilot of an airplane can detect any deviation of the plane of the wavefront from a position perpendicular to the earth's surface and so obtain a warning of the presence of a large conductive mass such as a mountain between the airplane and the transmitting station.

It is another object of my invention to provide a means whereby the pilot of an airplane can maintain the proper gliding angle while making a blind landing.

The novel feature of my invention whereby the above objects are attained is the use of two separate channels in a radio receiver, one channel indicating the phase polarity and output of a transverse antenna relative to a vertical antenna, and the other channel indicating the phase polarity and output of a longitudinal antenna relative to a vertical antenna. This feature, as well as other novel features which I believe to be characteristic of my invention are set forth in the appended claims. The invention itself, however, both as to its organization and method of operation together with further objects and advantages thereof, will best be understood by reference to the following description when read in connection with the accompanying drawings wherein—

Figure 1 is a typical antenna installation on an airplane suitable for use with the direction finding radio receiver described herein;

Fig. 2 is a block diagram showing the functions and interrelations of the various elements which make up my invention;

Fig. 3 is a schematic diagram of the circuit arrangement of one embodiment of my invention;

Fig. 4 is an alternative form of input circuit for the radio receiver which comprises my invention;

Fig. 5 is a sketch showing how the directional indication in a vertical plane would be employed in making a blind landing;

Fig. 6 is a sketch showing how obstacles might be avoided by the use of my invention.

Fig. 7 is a schematic diagram of one form of reversing means which might be employed with my invention;

Fig. 8 is a schematic diagram of an alternative method of phase reversal.

For simplicity, the filament heating circuits have been omitted from these figures, as means for energizing the filaments will be apparent to those versed in the art.

In Figure 2 is shown a block diagram of my radio receiver with the various units thereof shown in their inter-connecting relationship and is comprised in having three separate tuned input circuits, indicated in the diagram as the transverse antenna tuning, the vertical antenna tuning, and the longitudinal antenna tuning. It is intended that the transverse antenna tuning shall be responsive to signals, arriving to the right or left of the center line of the aircraft, due to pick up by a loop or other form of antenna electrically equivalent to a loop placed in a vertical plane transverse to the aircraft. It is intended that the vertical antenna tuning shall be responsive to any signal or component thereof, arriving from any direction in the horizontal plane of the aircraft, due to pick up by a vertical antenna or electrical equivalent thereof. It is intended that the longitudinal antenna tuning shall be responsive to any signal or component thereof, arriving either above or below the center line of the ship in a vertical plane thru the longitudinal axis of the ship, due to pick up by a longitudinal antenna or electrical equivalent thereof.

Each separate tuned circuit supplies a separate modulator, V1, V2, and V3. These modulators in combination with the radio frequency beating oscillator convert the three incoming radio frequency channels to three intermediate frequency channels. Of these intermediate frequency channels, two are connected to separate reversing means actuated by the separate audio oscillators generating audio frequencies F1 and F2. The third intermediate frequency channel, which is associated with the vertical antenna, may have a dummy network which produces the same phase change and attenuation in this channel as is produced by the reversing means in the other two channels. The intermediate frequency channel associated with the transverse antenna is equipped with a phase shifting network which shifts the phase of the sidebands produced by the reversing means by approximately 90 degrees, in order to compensate for the characteristic phase shift of 90 degrees between the loop and vertical antenna outputs. The intermediate frequency channel associated with the longitudinal antenna may also be equipped with a phase shifter, altho this is not a necessary feature of my invention.

The three intermediate frequency channels are then combined in a common intermediate frequency amplifier and detector and if the relative phase relations between the sidebands and intermediate frequency carrier have been properly adjusted, the output of the radio receiver will consist of the fundamental audio frequencies employed for operating the reversing means.

Phase polarity indicators are shown as connected to the audio amplifier output. One polarity indicator is supplied with an audio frequency current direct from the audio oscillator F1 and the other polarity indicator is supplied with audio frequency current from audio oscillator F2. The meter associated with the phase polarity indicator supplied with frequency F1 will be responsive only to the frequency generated by the reversing means in the transverse channel and may be calibrated in degrees left and right to indicate the deviation of the nose of the ship to the left or right of the perpendicular to the wavefront. The meter associated with the phase polarity indicator supplied with frequency F2 will be responsive only to the frequency generated by the reversing means in longitudinal channel and may be calibrated in degrees up and down to indicate the deviation of the nose of the ship up or down from the perpendicular to the wavefront.

Figure 3 is a detailed schematic diagram of the preferred embodiment of my invention. This diagram differs from the generalized diagram of Figure 2 in that the vertical and longitudinal antennas are combined in the same input circuits and the separation into a vertical and longitudinal channel performed in the intermediate frequency circuit. Referring now to Figure 3:

A loop antenna 1 is shown as inductively coupled to the tuned input circuit consisting of inductance 2 and condenser 3, which is associated with the input to the first detector or modulator 4. The loop winding is shown as grounded at the midpoint in order to reduce the direct electrostatic transfer of energy from the loop which would cause an error in the directional indication. This loop, which is referred to in Figure 1 and Figure 2 as the transverse antenna, may consist of a single turn transverse to the longitudinal axis of the airplane, fixed with respect to the airplane, or it may consist of a smaller multiturn loop capable of rotation about a vertical axis in the plane. The function of this antenna is to give an output which is a function of the angular deviation of the direction of arrival of the radio waves from a vertical plane which is perpendicular to the plane of the loop or transverse antenna.

The longitudinal antenna, as shown in the typical installation of Figure 1, is perpendicular to the wave front under normal flight conditions. Under these conditions, no voltage will be induced in the horizontal part of the atenna, since the magnetic field of the radio wave does not cut the horizontal part of the antenna. In Figure 3, the longitudinal antenna is shown as divided into two symmetrical halves 7 and 8, one half being capacitively coupled to the tuned circuit 9 having a tuning condenser 9' which is associated with the modulator 10, and the other half being capacitively coupled to tuned circuit 11 having a tuning condenser 11' which is associated with modulator 12. The outputs of modulators 10 and 12 are combined in the push-pull tuned transformer 13 and also in the tuned transformer 14 which is connected to the midpoint of transformer 13.

With this connection, and assuming equal efficiencies in modulators 10 and 12, no voltage will be produced between the output terminals of transformer 13' when equal radio frequency voltages are impressed on the grids of the two modulators. However, energy will be transferred to transformer 14, since the two modulators are effectively in parallel for this connection.

But if the radio frequency voltages of the longitudinal antenna halves are different when applied to the grids of the modulators 10 and 12, this increase on one modulator and decrease on the other causes a differential intermediate frequency voltage to be developed across the terminals of transformer 13'. This difference in voltage is caused by tilting the nose of the airplane either up or down from the perpendicular position with respect to the radio wave front so that a voltage is induced in the horizontal part of the longitudinal antenna which adds to the voltage induced in the vertical part on one half of the antenna and subtracts in the other half.

This circuit is similar to the phantom circuit familiar to those versed in the art of telephonic communication and produces a vertical antenna channel and a longitudinal antenna channel from the same pair of antenna wires.

The vacuum tubes 10 and 12 employed as modulators are shown as of the pentode type with suppressor grids 10' and 12' connected to a common oscillator 15 which supplies the radio frequency which beats with the incoming radio frequency of the antennas to produce an intermediate frequency according to the well known principle of superheterodyne radio reception.

The intermediate frequency output of transformer 13 is shown as connected to a copper oxide full wave rectifier 17 or equivalent device and of a type commonly employed as a rectifier of alternating current. This rectifier acts as a reversing switch, periodically interchanging the connections between input and output leads at the frequency of the alternating current of audio frequency supplied from audio oscillator 16 thru the split coil 16'. As is explained in detail in my copending application, Serial No. 648,912 the action of the full wave rectifier 17 is to produce sidebands of the intermediate frequency by modulation with the audio frequency, whereby the carrier is substantially suppressed.

In like manner, the intermediate frequency output from the modulator 4 and tuned transformer 18, is passed thru the full wave rectifier 19, which is supplied with audio frequency from audio oscillator 20 through the split coil 21. The audio oscillator 20 is tuned to a different audio frequency than the audio oscillator 16 so that the sidebands produced in the transverse antenna channel by the rectifier 19 will be of a different frequency than the sidebands produced in the longitudinal antenna channel by the rectifier 17.

The intermediate frequency sidebands from rectifier 19 are then passed thru the phase shifter 22 in order to produce effective modulation when combined with the intermediate frequency carrier. This intermediate frequency carrier is obtained from transformer 14, which is the vertical antenna channel. A dummy network 23 is connected between the transformer 14 and the coil 24, which introduces a phase shift and attenuation in the vertical antenna channel which is equal to the phase shift and attentuation produced in the loop and longitudinal antenna channels by the rectifiers 19 and 17.

Split coil 21, carrying the sideband currents from the transverse channel, and coil 16', which carries the sideband currents from the longitudinal channel, and coil 24, which carries the carrier current from the vertical channel, are all coupled to the inductance 25, which in combination with the condenser 26 forms the tuned input circuit to the intermediate frequency amplifier. If the proper phase relations have been maintained so that the side bands are effectively in phase with the carrier as explained in my copending application Serial No. 648,912 the input to amplifier 27 will be a carrier modulated at the fundamental frequencies of both audio oscillators 16 and 20.

Intermediate amplifier 27, detector 28, and audio amplifier 29 are typical and have no features unique to this invention. It is not intended that alterations in this circuit shall alter the scope of my invention, as for example the addition of an automatic gain control.

The audio output 29' of the receiver is shown as applied to the balanced rectifiers 30 and 31 thru the tuned circuits consisting of inductance 32 with condenser 33, and inductance 34 with condenser 35. The tuning of these circuits is so adjusted as to bring the phase of the audio output from the receiver into phase synchronism with the audio frequency applied directly to the rectifiers 30 and 31 from the audio oscillators 20 and 16 respectively, thru the balanced resistors 36 and 37.

It is well known in the art that such a balanced rectifier circuit will indicate the phase polarity between two currents of like frequency, when applied as shown in Figure 3. Meters 38 and 39 are shown as employed with rectifiers 30 and 31 respectively to indicate the phase polarity of each of the audio components in the receiver output with respect to the currents obtained directly from the output of the audio oscillators 20 and 16. It is not necessary that the currents of different frequencies in the audio output 29' be entirely separate in the two rectifiers, since a steady deflection of the needle will only be obtained for the currents of the same frequency as that obtained directly from the audio oscillator.

Since the phase polarity and magnitude of the output of the receiver having the same frequency as the audio oscillator 20 is dependant upon the phase polarity and magnitude of the output from the loop antenna, as is explained in detail in my copending application Serial No. 648,912, the sign and magnitude of the deflection of the needle of meter 38 will be proportional to the angular deviation of the direction of arrival of the radio waves from the vertical plane thru the loop antenna. By proper poling of the meter, the needle will indicate to the left when the nose of the airplane is to the left of the direction of the incoming waves, and to the right when the nose of the airplane is to the right.

In like manner, since the phase polarity and magnitude of the output of the receiver having the same frequency as the audio oscillator 16 is dependant upon the phase polarity and magnitude of the output from the longitudinal antenna channel, the sign and magnitude of the deflection of the needle of meter 39 will be proportional to the angular deviation of the direction of arrival of the radio waves with respect to the longitudinal antenna of the airplane. By proper poling of the meter, the needle will indicate upward when the nose of the airplane is raised above the perpendicular to the wavefront, or will indicate downwards when the nose of the airplane is lowered with respect to the perpendicular to said wavefront.

In order that the deflection of the needles shall be proportional to the deviation of the airplane from the perpendicular to the wavefront, it is necessary that the percentage modulation produced by the combination of the sidebands and carrier in coils 21, 16', and 24 shall be a constant, which requires that a constant effective phase relation exist between the sidebands and carrier. One of the requirements of such a constant phase relation is that the radio frequency tuning shall introduce the same phase shift for all dial settings, where the variable condensers 3, 9', and 11' are ganged together by a common tuning control. This requirement is met in the circuit of Fig. 3 by providing a condenser 40 on the loop channel and inductances 41 and 42 on the longitudinal antenna channels. A balanced equalizing condenser may be used as shown at 42 in Figure 3 to enable a very accurate balance of the circuits associated with the modulators 10 and 12, since a slight unbalance or misalignment of the tuning condensers 9' and 11 would give a false indication on meter 39.

A modification of the preferred form of circuit is shown in Figure 4. Modulator 44 is supplied from loop 43, and its output is connected to a reversing means 44' similar to that shown in Figure 3. Modulator 45 is connected to a vertical antenna 46 with its output connected to the dummy network 45' similar to that shown in Figure 3. A modulator 48 is connected to the longitudinal antenna 47 thru a balanced circuit consisting of condenser 50 and balanced inductance 49, and its output connected to a reversing means 48' similar to that shown in Figure 3. While this is a simpler circuit than that of Figure 3, it is not the preferred form since a special form of balanced variable condenser is required.

It is not intended to limit the use of this invention to a particular form of transverse antenna such as the loop described with reference to Figure 3 as other forms of antenna might be employed which have the directional characteristics of a loop. Neither is it intended to limit the invention to any particular form of vertical or longitudinal antenna.

Various other modifications come within the scope of this invention, as for example, a phase shifter might be employed in both the transverse and longitudinal antenna channels, and is so shown in the generalized diagram of Figure 2. Such a phase shifter would be required where there was a considerable spatial separation between the vertical and the longitudinal antennas, in order to compensate for phase shift caused by the different times of arrival of the radio waves at the two separated points. In another modification, the phase shifters might be eliminated as such, and the requisite phase shift produced by mistuning of the output transformers of the modulators. The dummy network in the vertical antenna channel might also be omitted and suitable modifications made in other elements of the circuit to produce the same phase shift as is produced by the reversing means which the dummy network simulates.

While a copper oxide full wave rectifier has been described as the preferred form of reversing means, other forms might be employed as is described in my copending application Serial No. 648,912.

A unique form of reversing means is shown in Figure 7 employing the same tubes for both audio oscillator and reversing means where two four electrode vacuum tubes are connected in a push-pull oscillating circuit by means of a tuned audio frequency transformer 53 which has one winding connected to the screen grid electrodes of the vacuum tubes 51 and 52 and which has the other winding connected with reverse poling to the grids of said vacuum tubes. Suitable radio frequency chokes 54 and 55 in combination with bypass condensers 56 and 57 permit the simultaneous application of a radio frequency input to the grids. The plates of the vacuum tubes are shown as connected to the push-pull radio or intermediate frequency output transformer 58.

When a high negative bias is applied to the grids of the tubes in the circuit of Figure 7, the audio frequency oscillations in the screen grid circuit will cause each tube to alternate as an amplifier for the positive audio half cycle and to be at cut off during the negative audio half cycle. The resultant output will consist of sidebands generated from the radio or intermediate frequency input by the audio frequency in the screen grid circuit, with the carrier substantially suppressed.

While the circuit of Figure 7 is shown in the preferred form with the control grids in parallel and the plates in push-pull, equivalent results would be obtained with the grids in push-pull and the plates in parallel. In another modification of this circuit, a second radio frequency might be supplied to heterodyne with the input radio frequency to produce sidebands of an intermediate frequency on the output, thereby using the same pair of tubes as a first detector in a superheterodyne circuit, as an audio oscillator, and as a reversing means.

Another form of unique reversing means is shown in Figure 8. In this arrangement the oscillator of a superheterodyne circuit is connected to the reversing means 60 which is actuated by an audio frequency F1 and to a second reversing means 61 which is actuated by audio frequency F2. The oscillator is also connected through a suitable impedance 62 to the first detector or modulator 63, which converts the incoming radio frequency current from the vertical antenna to the intermediate frequency.

The output of the reversing means 60, which is shown as a full wave copper oxide rectifier, is supplied to the modulator tube 64, which converts the incoming radio frequency current from the longitudinal antenna to sidebands of the intermediate frequency. The output of the reversing means 61 is supplied to the modulator tube 65, which converts the incoming radio frequency current from the transverse antenna to sidebands of the intermediate frequency. The phase of the current from the oscillator flowing into reversing means 61 is shifted in phase by a reactance 66 so that the intermediate frequency output of modulator 65 is shifted in phase by nearly 90 degrees. As has been explained heretofore, this shift in phase is made necessary by the phase relation between the loop output and the vertical antenna output. An impedance 67 is shown as connected in series with reversing means 60 to equalize the output of the two reversing means. No phase shift is ordinarily required in this circuit.

While it is preferred to employ the reversing means in a superheterodyne circuit as shown in Figure 3 or Figure 2, it is not intended to limit this invention to such a special form of circuit. For example, the reversing means might be placed in the radio frequency circuit and not in the intermediate circuit, or a tuned radio frequency circuit employed with the reversing means connected ahead of the first amplifier tube. Neither is it intended to limit the scope of this invention to direction finding in three dimensions, as the same receiving equipment might be used in connection with two loops and a vertical antenna for a more complete direction finding system in the horizontal plane.

The use of the receiving equipment described herein for making a blind landing is illustrated in Figure 5. It is assumed that the longitudinal antenna is so adjusted with respect to the longitudinal axis of the plane that the needle of the meter associated with the longitudinal antenna is in the zero center position when the plane is perpendicular to the wave front. This meter will be referred as the elevator control meter. The meter associated with the transverse antenna will be referred to as the rudder control meter. It is also assumed that the transmitting beacon is at the near side of the field and that it is down wind from the center of the field. The beacon operator may then transmit information which will aid the pilot in making a landing, such as barometric pressure at the ground, position of the beacon with regard to the center of the field, wind velocity, etc.

The pilot approaches the landing field along a compass course corresponding to the bearing of the center of the landing field with respect to the beacon, at the same time keeping the nose of the ship pointed toward the beacon in a horizontal plane by observation of the rudder control meter. Any excessive cross wind will be apparent by a variation in the compass course and may be compensated for by flying with the rudder control meter slightly off center in the direction of the cross wind. If the field is approached at an elevation of 1,000 feet with the plane in level flight as indicated by some form of pitch indicator, the elevator control meter will show a marked deflection upwards at a distance of approximately two miles. If the nose of the plane is then lowered to center the needle, the plane should be at the correct gliding angle. If this angle is maintained as the plane approaches the beacon and the wind is not excessive, the needle will remain on center as shown in position A of Figure 5. Furthermore, a simple triangulation from the known height and known gliding angle will give the distance of the plane from the beacon. If the wind is high so that the plane will undershoot the field at the fixed gliding angle, the needle will deflect downwards as shown at B, and it will be necessary to "gun" the motor to lift the plane to the proper angle. If the plane is so high as to overshoot the field at the fixed gliding angle, the needle will deflect upwards as shown at C and the pilot should start the glide over again at a greater distance from the field.

One advantage of this invention is that the elevator control needle gives a positive indication of the location of the beacon by giving a full scale deflection upward just before the plane passes over the beacon. When the plane has passed the beacon both rudder control and elevator control needles will respond in reverse direction, giving the pilot a further check on having passed over the beacon.

Another possible use of the method of direction finding in the vertical plane is shown in Figure 6. As is well known in the art of radio transmission, the wave front will be substantially perpendicular to a perfectly conducting surface or will lean forward in the direction of transmission in the case of a poorly conducting surface. By maintaining the nose of the airplane perpendicular to the wave front it might be possible to avoid mountains in the manner shown. Such inclination of the wavefront relative to the advancing airplane causes the phase polarity indicator to indicate a downward direction thus indicating to the pilot a possible obstruction ahead.

For example, a multi-element tube similar to the duplex diode pentode type might be employed in connection with a balanced transformer to incorporate the modulator and reversing means in a single tube. Neither is it intended to limit the scope of the invention to the location of the direction of a fixed transmitter from a mobile receiver, as a mobile transmitter might equally well be located from a fixed receiver.

Although specific embodiments of the invention have been illustrated and described, it will be understood that various alterations in the details of construction may be made without departing from the scope of the invention, as indicated by the appended claims.

What I claim is:

1. A radio receiving apparatus comprising a plurality of input channels, a reversing means in all but one of said channels with each reversing means effectively interchanging the poling of input and output leads of said reversing means at an audio frequency rate which is different for each of the said reversing means, and means for combining the outputs of the reversing means with the output of the channel which has no reversing means, means for correcting the phase of the currents in said channels to produce effective modulation at the fundamental audio frequencies employed in operating the reversing means, a common amplifier and detector supplied by the said combined channel outputs, a plurality of phase polarity indicators connected in the output of the radio receiver, and means for supplying each of said phase polarity indicators with a separate audio frequency, each separate audio frequency being synchronous with one of the audio frequency rates at which the said reversing means are operated.

2. A direction finding apparatus for aircraft comprising in combination, a vertical antenna, a transverse antenna, a longitudinal antenna, a first audio oscillator, a second audio oscillator, a first reversing means connected to the output of said transverse antenna for periodically reversing the phase of the output thereof at the frequency of said first audio oscillator, a second reversing means connected to the output of said longitudinal antenna for periodically reversing the phase of the output thereof at the frequency of said second audio oscillator, a radio receiver having an input circuit connected to the outlets of both said reversing means, means for connecting said radio receiver input circuit with said vertical antenna, a first polarity indicator connected to the output of said radio receiver and adapted to indicate the phase polarity of the audio output of the radio receiver at the audio frequency generated by the action of said first reversing means, a second polarity indicator connected to the output of said radio receiver and adapted to indicate the phase polarity of the audio output thereof at the audio frequency generated by the action of the second reversing means, and means for connecting the said phase polarity indicators to the respective outputs of said first and second audio oscillators.

3. Means for indicating the direction of arrival of an incoming radio frequency signal comprising three separate antenna systems, the first antenna having the directional properties of a loop, the second antenna being non-directional and responsive to the horizontal component of the signal, the third antenna being non-directional and responsive to the vertical component of the signal, means for receiving and periodically reversing the phase polarity of the output current derived from said first antenna, means for receiving and periodically reversing the phase of the output current derived from said second antenna, at a different rate than the rate of periodic reversal of the output derived from said first antenna, means for shifting the currents derived from said first and said second antennas to coincide with the phase of the current derived from said third antenna, a combined amplifier and detector for receiving and combining the currents derived from all three antennas to produce a current consisting of a carrier and two pairs of side bands, and means for selectively indicating the phase polarity of two low frequency outputs produced by detection of the two pairs of side bands.

4. A radio receiving apparatus for indicating the direction of arrival of radio signals comprising in combination a transverse antenna tuning means, a longitudinal antenna tuning means, a vertical antenna tuning means, a first modulator connected to the transverse antenna tuning means, a second modulator connected to the longitudinal antenna tuning means, a third modulator connected to the vertical antenna tuning means, a first audio oscillator, a second audio oscillator, a radio frequency oscillator supplying a radio frequency to all three of said modulators which differs from the signal radio frequency by an intermediate frequency, a first intermediate frequency output channel for said first modulator, a first reversing means in said intermediate frequency output channel of the first modulator, said reversing means operating at the frequency of the first audio oscillator, a second intermediate frequency output channel for said second modulator, a second reversing means in said second intermediate frequency output channel of the second modulator, said second reversing means operating at the frequency of the second audio oscillator, phase shifting means in the intermediate frequency output channel of said third modulator, an intermediate frequency output channel for said third modulator, a dummy network in the intermediate frequency output channel of the third modulator and having substantially the same impedance characteristics as the reversing means in the other two intermediate frequency output channels, means for combining the intermediate output currents from the said first and second reversing means with the output current from said dummy network, an intermediate frequency amplifier connected with said means and supplied by said combined intermediate frequency amplifier, a first means to indicate the phase polarity of the audio output of the detector at the frequency generated by the first audio oscillator, a second means to indicate the phase polarity of the audio output of the detector at the frequency generated by the second audio oscillator, and means for supplying currents to the first and second polarity indicators from the first and second audio oscillators respectively.

5. A radio receiving system for indicating the direction from which radio signals arrive with respect to a known longitudinal axis through a mobile vehicle, comprising a transverse antenna having the electrical properties of a loop, a longitudinal antenna consisting of two halves electrically balanced with respect to the structure of said mobile vehicle and having its electrical center displaced vertically from the electrical center of said mobile vehicle, a first tuning means inductively coupled to the transverse antenna, a second tuning means capacitively coupled to the forward half of the longitudinal antenna, a third tuning means capacitively coupled to the after half of the longitudinal antenna, means for rendering said tuning means simultaneously adjustable and electrically similar, a first modulator connected to the first tuning means, a second modulator connected to the second tuning means, a third modulator connected to the third tuning means, a beating frequency oscillator connected to all three of said modulators to produce an intermediate frequency by combination with the signal frequency of said modulators, a first intermediate frequency output channel supplied by the output from the first modulator, a second intermediate output channel supplied by the second and third modulators acting in parallel, a third intermediate frequency output channel supplied by the second and third modulators acting in series therewith, a source of first audio frequency current, a reversing means in the first intermediate frequency channel operated by said first audio frequency current, a source of second audio frequency current, a reversing means in the third intermediate frequency channel operated by said second audio frequency current, phase shifting means in the other of said intermediate frequency channels, means for combining the outputs of all three intermediate frequency channels, an amplifier, a common input from said means for combining said outputs to said amplifier, a detector connected to said amplifier, a first phase polarity indicator connected to said detector and to said first source of audio frequency, and a second phase polarity indicator connected to said detector and to said second source of audio frequency.

6. In a direction finding receiver of the superheterodyne type, the combination of a first modulator, a first antenna supplying said first modulator, a second modulator, a second antenna supplying said second modulator, a third modulator, a third antenna supplying said third modulator, a first audio frequency source, a second audio frequency source, a radio frequency beating oscillator coupled to the first modulator through a reversing means actuated by the first audio frequency, coupled to the second modulator through a reversing means actuated by the second audio frequency, and coupled to the third modulator through a non-reversing means; together with means for shifting the phase of the radio frequency supplied to the said reversing means.

7. The method of indicating the direction of arrival of a radio frequency wave with respect to a mobile body which consists in producing from said wave a component directly proportional to angular positioning of the transverse axis of the body relative to the direction of arrival of said wave, in producing from said wave a component directly proportional to angular positioning of the vertical axis of the body relative to the direction of arrival of said wave, in producing from said wave a component directly proportional to the angular positioning of the longitudinal axis of the body relative to the direction of arrival of said wave, producing two separate audio frequencies by phase reversal of said components, and comparing the phase polarity of the two separate audio frequencies thus produced with waves of audio frequency generated at the point of reception.

8. The method of indicating the direction of arrival of a radio frequency wave with respect to a mobile body which consists in producing from said wave a component directly proportional to angular positioning of the transverse axis of the body relative to the direction of arrival of said wave, in producing from said wave a component directly proportional to angular positioning of the vertical axis of the body relative to the direction of arrival of said wave, in producing from said wave a component directly proportional to the angular positioning of the longitudinal axis of the body relative to the direction of arrival of said wave, in periodically reversing the phase of two of the components thus produced at different rates, in shifting the phase of the current thus derived to coincide with the phase of the other component, in producing a current consisting of a carrier and two pair of side bands, and selectively indicating the phase polarity of the two low frequencies produced by detection of the two pair of side bands.

JOHN W. GREIG.